United States Patent
Granger-Jones et al.

(10) Patent No.: US 8,682,260 B1
(45) Date of Patent: Mar. 25, 2014

(54) POWER AMPLIFIER WITH TUNABLE BANDPASS AND NOTCH FILTER

(75) Inventors: Marcus Granger-Jones, Scotts Valley, CA (US); Nadim Khlat, Midi-Pyrenees (FR); Ruediger Bauder, Feldkirchen-Westerham (DE)

(73) Assignee: RF Micro Devices, Inc., Greensboro, NC (US)

( * ) Notice: Subject to any disclaimer, the term of this patent is extended or adjusted under 35 U.S.C. 154(b) by 1183 days.

(21) Appl. No.: 12/607,634

(22) Filed: Oct. 28, 2009

Related U.S. Application Data

(60) Provisional application No. 61/108,907, filed on Oct. 28, 2008.

(51) Int. Cl.
*H04B 1/40* (2006.01)
*H04B 1/16* (2006.01)

(52) U.S. Cl.
USPC ............................................ 455/77; 455/339

(58) Field of Classification Search
USPC .......... 455/77, 114.3, 127.1, 127.3, 341, 144, 455/253.2, 293, 340, 168.1, 339
See application file for complete search history.

(56) References Cited

U.S. PATENT DOCUMENTS 6,636,128 B2 * 10/2003 Rauscher ....................... 333/175
7,848,710 B2 * 12/2010 Rofougaran ..................... 455/75

OTHER PUBLICATIONS

Guo, Chunbing et al., "A Monolithic 2-V 950-MI-z CMOS Bandpass Amplifier with A Notch Filter for Wireless Receivers," 2001 IEEE Radio Frequency Integrated Circuits Symposium, 2001, pp. 79-82, IEEE.
Chi, Baoyong et al., "A Superheterodyne Receiver Front-End With On-Chip Automatically Q-Tuned Notch Filters," 2007 IEEE Radio Frequency Integrated Circuits Symposium, Jun. 3-5, 2007, pp. 21-24, IEEE.
Tenbroek, Bernard et al, "Single-Chip Tri-Band WCDMA/HSDPA Transceiver without External SAW Filters and with Integrated TX Power Control," 2008 IEEE International Solid-State Circuits Conference, Feb. 3-7, 2008, pp. 202-203, 607, IEEE.

* cited by examiner

*Primary Examiner* — Eugene Yun
(74) *Attorney, Agent, or Firm* — Withrow & Terranova, P.L.L.C.

(57) ABSTRACT

The present disclosure relates to a multi-band RF power amplifier (PA) module, which is used to receive, filter, and amplify a first RF input signal to provide a first RF output signal using a first tunable bandpass and notch filter. The multi-band RF PA module may include a supporting substrate having at least a first inductive element that provides a first portion of the first tunable bandpass and notch filter. Further, the multi-band RF PA module may include at least a first semiconductor die, which is attached to the supporting substrate and provides a second portion of the first tunable bandpass and notch filter. A transceiver module may provide the first RF input signal.

20 Claims, 17 Drawing Sheets

POWER AMPLIFIER WITH TUNABLE BANDPASS AND NOTCH FILTER

This application claims the benefit of provisional patent application Ser. No. 60/108,907, filed Oct. 28, 2008, the disclosure of which is hereby incorporated herein by reference in its entirety.

FIELD OF THE DISCLOSURE

Embodiments of the present disclosure relate to radio frequency (RF) power amplifier (PA) modules and RF filter circuits, both of which may be used in RF communications systems.

BACKGROUND OF THE DISCLOSURE

As integrated circuit (IC) technologies evolve, ICs tend to move toward finer geometries and toward integrating more functionality into a single semiconductor die. For example, a wireless communications device may include a multi-band transceiver system-on-a-chip (SoC) that may integrate microcontroller functionality, memory, system interfaces, baseband processing, analog-to-digital and digital-to-analog conversion, digital filtering, RF receive down-conversion circuitry, and RF transmitter modulation and amplification circuitry into a single multi-band SoC semiconductor die. The integration of digital signals, RF receive signals, RF local oscillator (LO) signals, and RF transmit signals into a single die is challenging in the face of RF transmit linearity, spur, noise, and power consumption requirements.

The multi-band SoC semiconductor die may be combined with a multi-band RF front-end module (FEM) to provide the wireless communications device. The multi-band RF FEM may include, a multi-band RF power amplifier (PA) module, multi-band RF receive circuitry, and multi-band RF switch circuitry. A typical multi-band SoC semiconductor die may have an RF transmit output power requirement of about +3 dBm (decibel milliwatt), a 1 dB (decibel) output compression point (OP1 dB) requirement of about +9 dBm, and a receive band noise floor requirement of about −159 dB with respect to the carrier (dBc) per Hertz (Hz). Further, as the geometries of SoC semiconductor dies evolve from 90 nanometer (nm) technology toward 65 nm and 32 nm technologies, meeting the RF transmit linearity, spur, noise, and power consumption requirements may be extremely challenging due to hostile spur environments of SoC architectures and low breakdown voltages of 65 nm and 32 nm transistors. Thus, there is a need to provide a wireless communications device having a multi-band SoC semiconductor die that meets RF transmit output power and linearity, spur, noise, and power consumption requirements.

SUMMARY OF THE EMBODIMENTS

The present disclosure relates to a multi-band RF power amplifier (PA) module, which is used to receive, filter, and amplify a first RF input signal to provide a first RF output signal using a first tunable bandpass and notch filter. The multi-band RF PA module may include a supporting substrate having at least a first inductive element that provides a first portion of the first tunable bandpass and notch filter. Further, the multi-band RF PA module may include at least a first semiconductor die, which is attached to the supporting substrate and provides a second portion of the first tunable bandpass and notch filter. A transceiver module may provide the first RF input signal, which may be a first RF transmit signal, to the multi-band RF PA module, such that the first tunable bandpass and notch filter may reduce a noise spur from the transceiver module or may reduce RF receive band noise from the transceiver module, which may relax transceiver module receive noise floor requirements. In this regard, a first notch frequency of the first tunable bandpass and notch filter may be at an RF receive frequency, and a first peak frequency of the first tunable bandpass and notch filter may be at an RF transmit frequency. Further, in a full-duplex system, the RF receive frequency may have a duplex frequency offset from the RF transmit frequency. Therefore, the first notch frequency may have the duplex frequency offset from the first peak frequency.

Some embodiments of the multi-band RF PA module may include a first PA driver, which may be used to receive and amplify the first RF input signal to provide a first amplified RF signal to the first tunable bandpass and notch filter. The first PA driver adds power gain to the multi-band RF PA module that may be used to compensate for loss in the first tunable bandpass and notch filter, to relax transceiver module output power requirements, or both. The multi-band RF PA module may be a multi-mode multi-band RF PA module supporting multiple operating modes, such as a half-duplex operating mode and a full-duplex operating mode. Some embodiments of the first tunable bandpass and notch filter may include the first fixed inductive element coupled in parallel with a series combination of a second fixed inductive element, a first fixed capacitive element, and a first switchable capacitor array. The first switchable capacitor array may be used to provide a first digital tunable capacitor (DTC) array, which may be used to simultaneously tune the first notch frequency and the first peak frequency. The first fixed capacitive element may reduce RF signal swings seen by the first DTC array, thereby improving linearity of the first tunable bandpass and notch filter. Additional embodiments of the first tunable bandpass and notch filter may further include a second DTC array coupled in parallel with the first fixed inductive element, such that a first offset between the first notch frequency and the first peak frequency may be adjusted. The first and second DTC arrays may be provided by the first semiconductor die, and the first and second inductive elements may be provided by the first supporting substrate, which may provide high Q inductive elements needed by the first tunable bandpass and notch filter.

Alternate embodiments of the multi-band RF PA module may be used to receive, filter, and amplify multiple RF input signals to provide multiple RF output signals using multiple tunable bandpass and notch filters. The multi-band RF PA module may include the supporting substrate having at least one inductive element that provides one portion of each tunable bandpass and notch filter. Further, the multi-band RF PA module may include at least the first semiconductor die, which is attached to the supporting substrate and provides another portion of each tunable bandpass and notch filter. The transceiver module may provide the RF input signals, which may be RF transmit signals, to the multi-band RF PA module, such that the tunable bandpass and notch filters may reduce noise spurs from the transceiver module or may reduce RF receive band noise from the transceiver module, which may relax transceiver module receive noise floor requirements, or both.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION OF THE PREFERRED EMBODIMENTS

Figure 1:
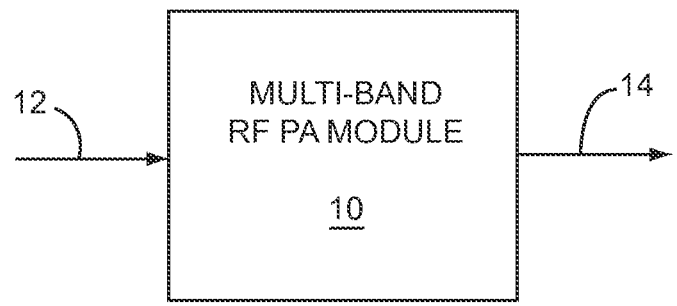
FIG. 1 shows a multi-band RF PA module according to one embodiment of the multi-band RF PA module.

The embodiments set forth below represent the necessary information to enable those skilled in the art to practice the disclosure and illustrate the best mode of practicing the disclosure. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

The present disclosure relates to a multi-band RF power amplifier (PA) module, which is used to receive, filter, and amplify a first RF input signal to provide a first RF output signal using a first tunable bandpass and notch filter. The multi-band RF PA module may include a supporting substrate having at least a first inductive element that provides a first portion of the first tunable bandpass and notch filter. Further, the multi-band RF PA module may include at least a first semiconductor die, which is attached to the supporting substrate and provides a second portion of the first tunable bandpass and notch filter. A transceiver module may provide the first RF input signal, which may be a first RF transmit signal, to the multi-band RF PA module, such that the first tunable bandpass and notch filter may reduce a noise spur from the transceiver module or may reduce RF receive band noise from the transceiver module, which may relax transceiver module receive noise floor requirements. In this regard, a first notch frequency of the first tunable bandpass and notch filter may be at an RF receive frequency to reduce RF receive band noise, and a first peak frequency of the first tunable bandpass and notch filter may be at an RF transmit frequency, such that a bandpass region of the first tunable bandpass and notch filter encompasses the bandwidth of the first RF transmit signal. Maintaining relatively constant gain across the bandwidth of the first RF transmit signal may be needed to meet distortion requirements. Further, in a full-duplex system, the RF receive frequency may have a duplex frequency offset from the RF transmit frequency. Therefore, the first notch frequency may have the duplex frequency offset from the first peak frequency.

Some embodiments of the multi-band RF PA module may include a first PA driver, which may be used to receive and amplify the first RF input signal to provide a first amplified RF signal to the first tunable bandpass and notch filter. The first PA driver adds power gain to the multi-band RF PA module that may be used to compensate for loss in the first tunable bandpass and notch filter, to relax transceiver module output power requirements, or both. The multi-band RF PA module may be a multi-mode multi-band RF PA module supporting multiple operating modes, such as a half-duplex operating mode and a full-duplex operating mode. Some embodiments of the first tunable bandpass and notch filter may include the first fixed inductive element coupled in parallel with a series combination of a second fixed inductive element, a first fixed capacitive element, and a first switchable capacitor array. The switchable capacitor array may be used to provide a first digital tunable capacitor (DTC) array, which may be used to simultaneously tune the first notch frequency and the first peak frequency. The first fixed capacitive element may reduce RF signal swings seen by the first DTC array, thereby improving linearity of the first tunable bandpass and notch filter. Additional embodiments of the first tunable bandpass and notch filter may further include a second DTC array coupled in parallel with the first fixed inductive element, such that a first offset between the first notch frequency and the first peak frequency may be adjusted. The first and second DTC arrays may be provided by the first semiconductor die and the first and second inductive elements may be provided by the supporting substrate, which may provide high Q inductive elements needed by the first tunable bandpass and notch filter.

Alternate embodiments of the multi-band RF PA module may be used to receive, filter, and amplify multiple RF input signals to provide multiple RF output signals using multiple tunable bandpass and notch filters. The multi-band RF PA module may include the supporting substrate having at least one inductive element that provides a one portion of each tunable bandpass and notch filter. Further, the multi-band RF PA module may include at least the first semiconductor die, which is attached to the supporting substrate and provides a another portion each tunable bandpass and notch filter. The transceiver module may provide the RF input signals, which may be RF transmit signals, to the multi-band RF PA module, such that the tunable bandpass and notch filters may reduce noise spurs from the transceiver module or may reduce RF receive band noise from the transceiver module, which may relax transceiver module receive noise floor requirements, or both.

FIG. 1 shows a multi-band RF PA module 10 according to one embodiment of the multi-band RF PA module 10. The multi-band RF PA module 10 is used to receive, filter, and amplify a first RF input signal 12 to provide a first RF output signal 14 using a first tunable bandpass and notch filter (not shown). In one embodiment, the multi-band RF PA module 10 is a multi-mode multi-band RF PA module 10, which may be capable of receiving, filtering, and amplifying simplex RF signals, half-duplex RF signals, full-duplex RF signals, or any combination thereof.

Figure 2:
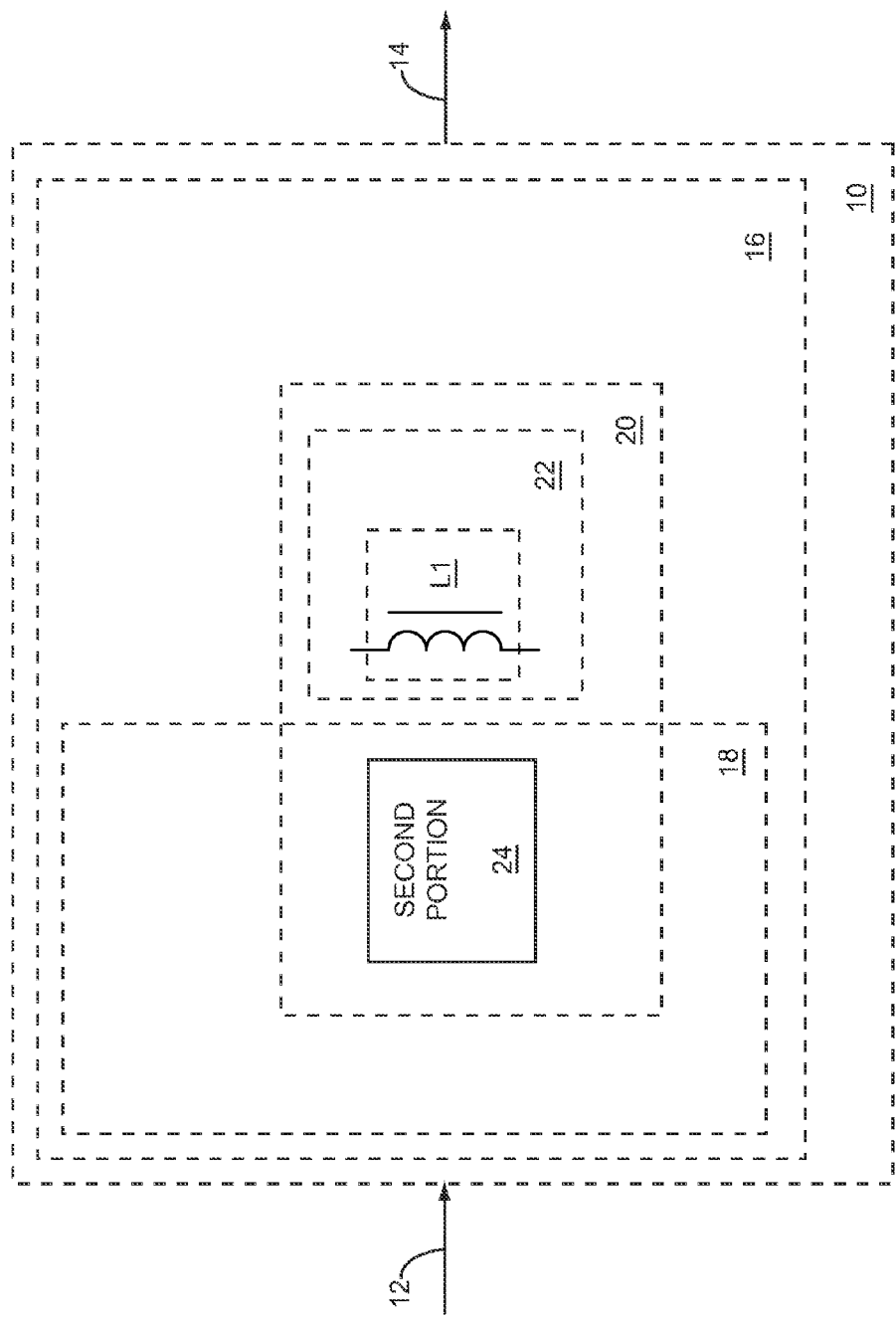
FIG. 2 shows details of the multi-band RF PA module illustrated in FIG. 1 according to one embodiment of the multi-band RF PA module.

FIG. 2 shows details of the multi-band RF PA module 10 illustrated in FIG. 1 according to one embodiment of the multi-band RF PA module 10. The multi-band RF PA module 10 includes a supporting substrate 16 and at least a first semiconductor die 18, which is attached to the supporting substrate 16. The supporting substrate 16 and the first semiconductor die 18 are used to form a first tunable bandpass and notch filter 20. The supporting substrate 16 has at least a first inductive element L1 that provides a first portion 22 of the first tunable bandpass and notch filter 20. Further, at least the first semiconductor die 18 provides a second portion 24 of the first tunable bandpass and notch filter 20. The supporting substrate 16 may effectively provide high-Q inductive elements, such as printed inductive elements, discrete surface mount device (SMD) inductive elements, bond wires that serve as inductive elements, or any combination thereof. As such, the supporting substrate 16 may provide any or all of the inductive elements used in the first tunable bandpass and notch filter 20.

Figure 3:
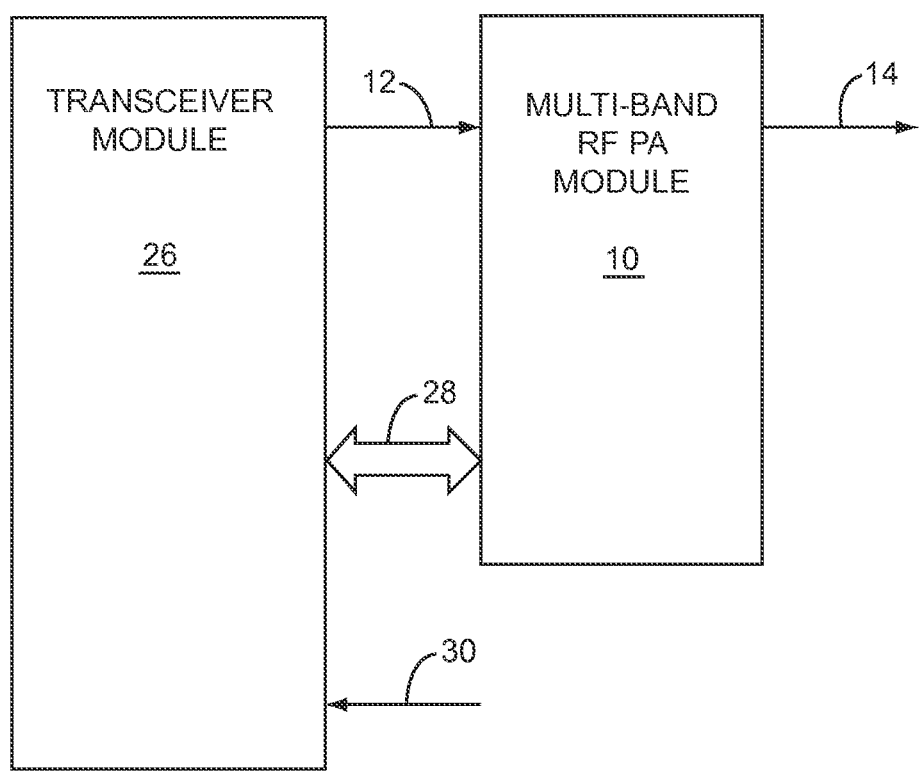
FIG. 3 shows a transceiver module and the multi-band RF PA module according to one embodiment of the transceiver module and the multi-band RF PA module.

FIG. 3 shows a transceiver module 26 and the multi-band RF PA module 10 according to one embodiment of the transceiver module 26 and the multi-band RF PA module 10. The transceiver module 26 provides the first RF input signal 12 to the multi-band RF PA module 10, which is used to receive, filter, and amplify the first RF input signal 12 to provide the first RF output signal 14 using the first tunable bandpass and notch filter 20 (FIG. 2). The first RF input signal 12 may be a first RF transmit signal and the first RF output signal 14 may be a filtered and amplified first RF transmit signal. Control signals 28 between the transceiver module 26 and the multi-band RF PA module 10 may be used to control the multi-band RF PA module 10, to tune the first tunable bandpass and notch filter 20, or both. The transceiver module 26 may include a multi-band SoC semiconductor die and may receive at least one RF receive signal 30. When the first notch frequency of the first tunable bandpass and notch filter 20 is tuned to a first desired receive frequency, receive band noise floor requirements of the transceiver module 26 may be relaxed. In an exemplary embodiment of the multi-band RF PA module 10, the multi-band RF PA module 10 is used with a transceiver module 26 having a receive band noise floor requirement of less than or equal to about −153 dBc per Hz.

Figure 4:
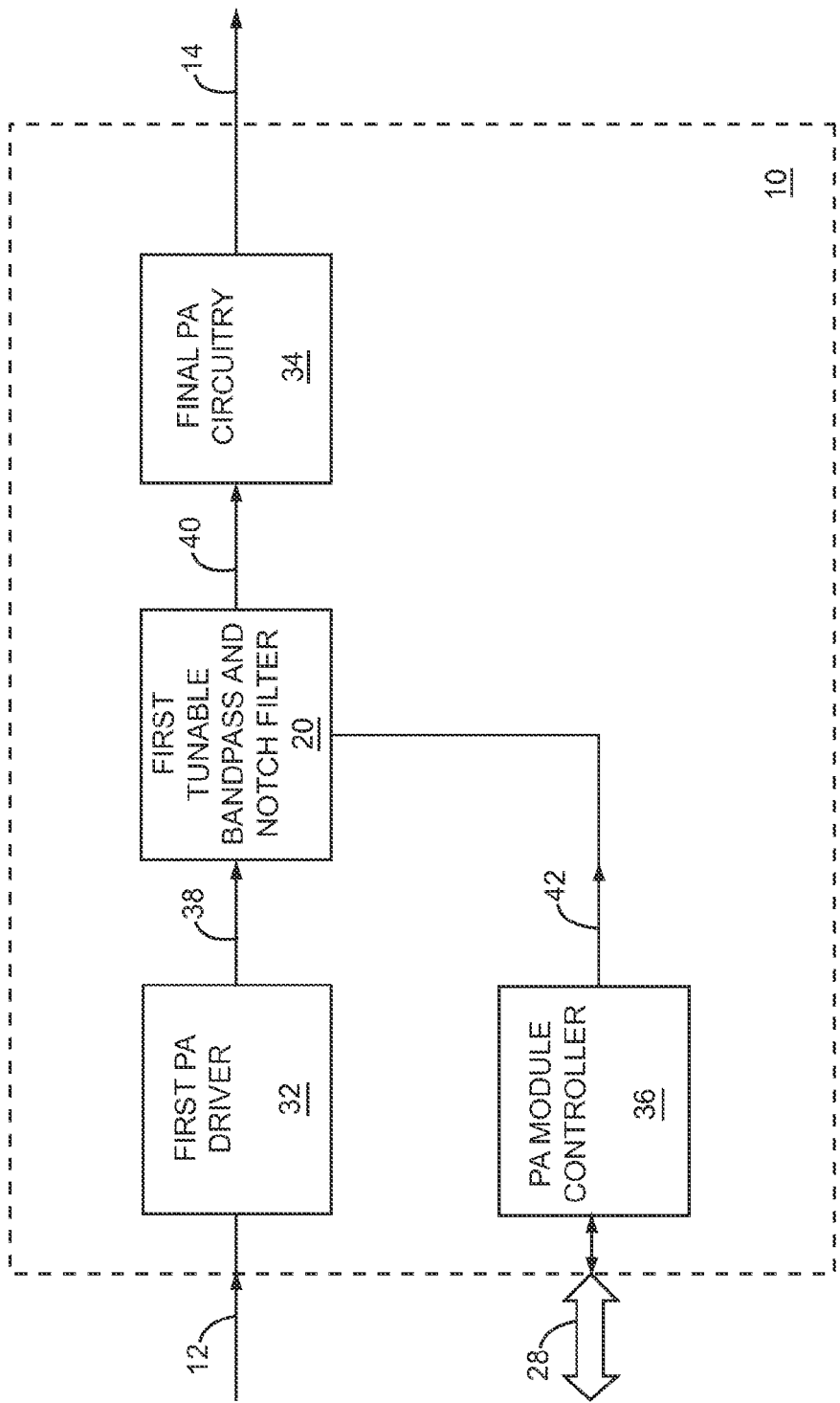
FIG. 4 shows details of the multi-band RF PA module illustrated in FIG. 3 according to one embodiment of the multi-band RF PA module.

FIG. 4 shows details of the multi-band RF PA module 10 illustrated in FIG. 3 according to one embodiment of the multi-band RF PA module 10. The multi-band RF PA module 10 includes the first tunable bandpass and notch filter 20, a first PA driver 32, final PA circuitry 34, and a PA module controller 36. The first RF input signal 12 feeds the first PA driver 32, which amplifies the first RF input signal 12 to provide a first amplified RF signal 38 to the first tunable bandpass and notch filter 20. The first tunable bandpass and notch filter 20 filters the first amplified RF signal 38 to provide a first filtered RF signal 40 to the final PA circuitry 34, which amplifies the first filtered RF signal 40 to provide the first RF output signal 14. The PA module controller 36 receives and provides the control signals 28 from and to the transceiver module 26 (FIG. 3), and provides a first filter control signal 42 to the first tunable bandpass and notch filter 20 based on the control signals 28. The first tunable bandpass and notch filter 20 tunes the first notch frequency, the first peak frequency, or both based on the first filter control signal 42. The first PA driver 32 may add about net 6 dB of power gain and additional power gain to compensate for losses in the first tunable bandpass and notch filter 20.

When the first notch frequency of the first tunable bandpass and notch filter 20 is tuned to a first desired receive frequency, the receive band noise floor requirements of the transceiver module 26 (FIG. 3) may be relaxed. Further, by providing gain using the first PA driver 32, the RF transmit output power requirement of the transceiver module 26 may be relaxed. In a first exemplary embodiment of the multi-band RF PA module 10, the multi-band RF PA module 10 is used with the transceiver module 26 having an RF transmit output power requirement of greater than or equal to about −3 dBm. In a second exemplary embodiment of the multi-band RF PA module 10, the multi-band RF PA module 10 is used with a transceiver module 26 having an RF transmit output power requirement of greater than or equal to about −3 dBm and having a receive band noise floor requirement of less than or equal to about −153 dBc per Hz. In an alternate embodiment of the multi-band RF PA module 10, the first PA driver 32 is omitted.

Figure 5:
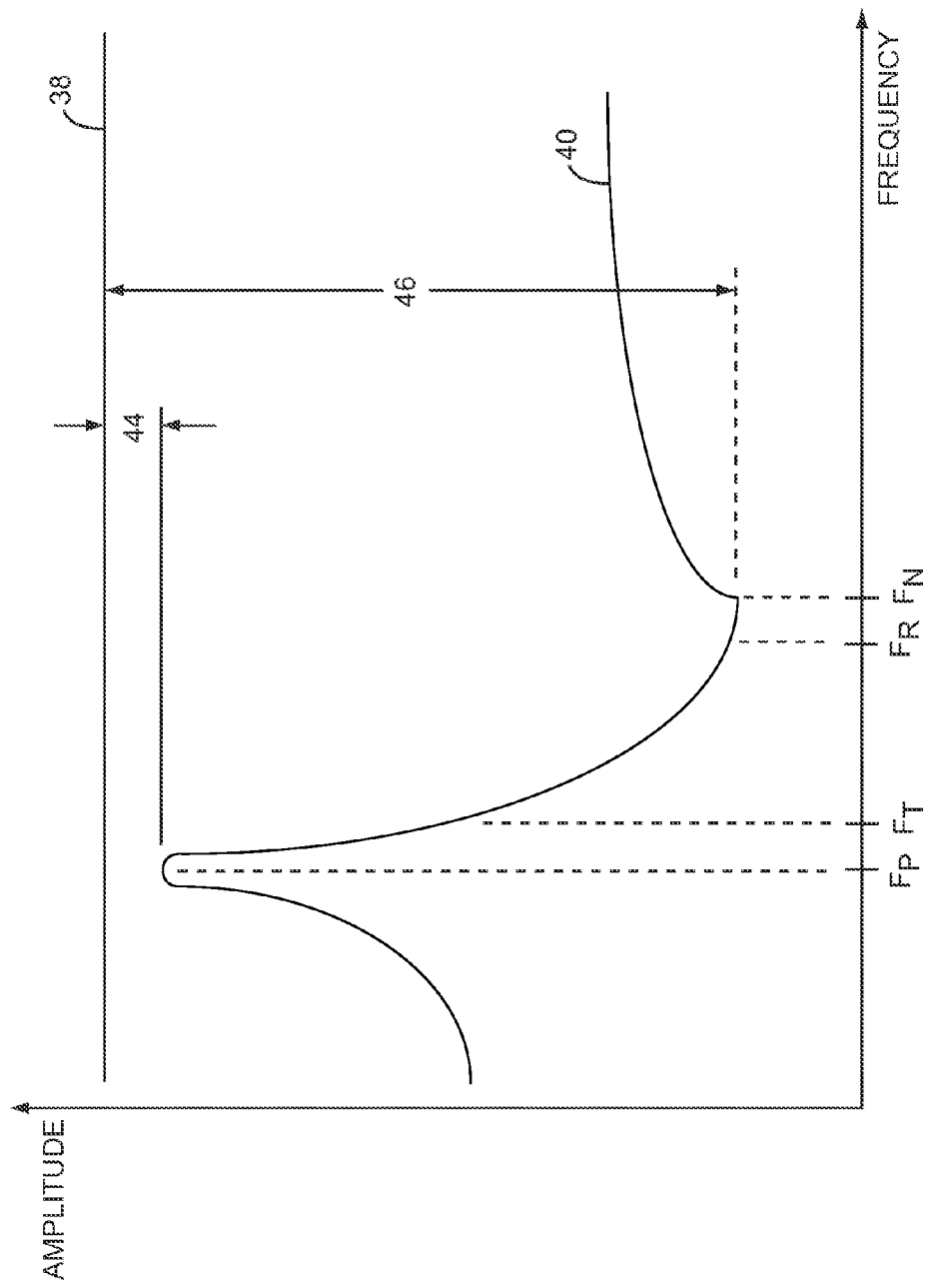
FIG. 5 shows a frequency response curve of a first tunable bandpass and notch filter illustrated in FIG. 3 according to one embodiment of the first tunable bandpass and notch filter.

FIG. 5 shows a frequency response curve of the first tunable bandpass and notch filter 20 illustrated in FIG. 3 according to one embodiment of the first tunable bandpass and notch filter 20. Specifically, FIG. 5 illustrates how the first amplified RF signal 38 (FIG. 4) and the first filtered RF signal 40 (FIG. 4) vary with frequency. The first amplified RF signal 38 does not significantly vary with frequency. Therefore, the first filtered RF signal 40, which is based on the first amplified RF signal 38, is indicative of the filter behavior of the first tunable bandpass and notch filter 20. The filter behavior shows a peak at a first peak frequency $F_P$ and a valley, or notch, at a first notch frequency $F_N$. Ideally, a desired signal would have the first peak frequency $F_P$ and an undesired signal would have the first notch frequency $F_N$. The first peak frequency $F_P$ is associated with a first insertion loss 44, which provides an indication of how well the first tunable bandpass and notch filter 20 passes desired signals at the first peak frequency $F_P$. Conversely, the first notch frequency $F_N$ is associated with a first attenuation 46, which provides an indication of how well the first tunable bandpass and notch filter 20 filters out or removes undesired signals at the first notch frequency $F_N$.

The transceiver module 26 (FIG. 3) provides the first RF input signal 12, which may be a first RF transmit signal, to the multi-band RF PA module 10. In a first exemplary embodiment of the first tunable bandpass and notch filter 20, the first tunable bandpass and notch filter 20 reduces a noise spur from the transceiver module 26, such that the first notch frequency $F_N$ is about equal to a frequency of the noise spur. Alternatively, the first tunable bandpass and notch filter 20 reduces RF receive band noise from the transceiver module 26, which may relax receive noise floor requirements of the transceiver module 26. The first tunable bandpass and notch filter 20 may provide between about 8 dB and 15 dB of filtering of RF receive band noise and may simultaneously provide some filtering of spurious clock signals in the first RF input signal. Ideally, during full-duplex operation, the first peak frequency $F_P$ would be equal to a first desired transmit frequency $F_T$ and the first notch frequency $F_N$ would be equal to a first desired receive frequency $F_R$ to pass the first RF transmit signal and to block any RF receive signals.

However, if the duplex frequency offset between the first desired transmit frequency $F_T$ and the first desired receive frequency $F_R$ is less than the frequency difference between the first peak frequency $F_P$ and the first notch frequency $F_N$, as illustrated in FIG. 5, a compromise may be needed. From FIG. 5, as the first desired transmit frequency $F_T$ moves away from the first peak frequency $F_P$, the first insertion loss 44 may suffer dramatically. However, as the first desired receive frequency $F_R$ moves away from the first notch frequency $F_N$, the first attenuation 46 may not change dramatically. Further, the multi-band RF PA module 10 may be more sensitive to the first insertion loss 44 than to the first attenuation 46. Therefore, in a second exemplary embodiment of the first tunable bandpass and notch filter 20, the first tunable bandpass and notch filter 20 reduces RF receive band noise from the transceiver module 26, such that the first desired transmit frequency $F_T$ is about equal to the first peak frequency $F_P$. The first tunable bandpass and notch filter 20 may be tuned for maximum gain at the first desired transmit frequency $F_T$ and whatever attenuation is provided by the first tunable bandpass and notch filter 20 at the first desired receive frequency $F_R$ may be acceptable.

In a third exemplary embodiment of the first tunable bandpass and notch filter 20, the first tunable bandpass and notch filter 20 reduces RF receive band noise from the transceiver module 26, such that a difference between the first desired transmit frequency $F_T$ and the first peak frequency $F_p$ is based on a maximum acceptable first insertion loss 44, and a difference between the first desired receive frequency $F_R$ and the first notch frequency $F_N$ is based on a minimum acceptable first attenuation 46. In a fourth exemplary embodiment of the first tunable bandpass and notch filter 20, the first tunable bandpass and notch filter 20 reduces RF receive band noise from the transceiver module 26, such that the first desired receive frequency $F_R$ is about equal to the first notch frequency $F_N$.

Figure 6:
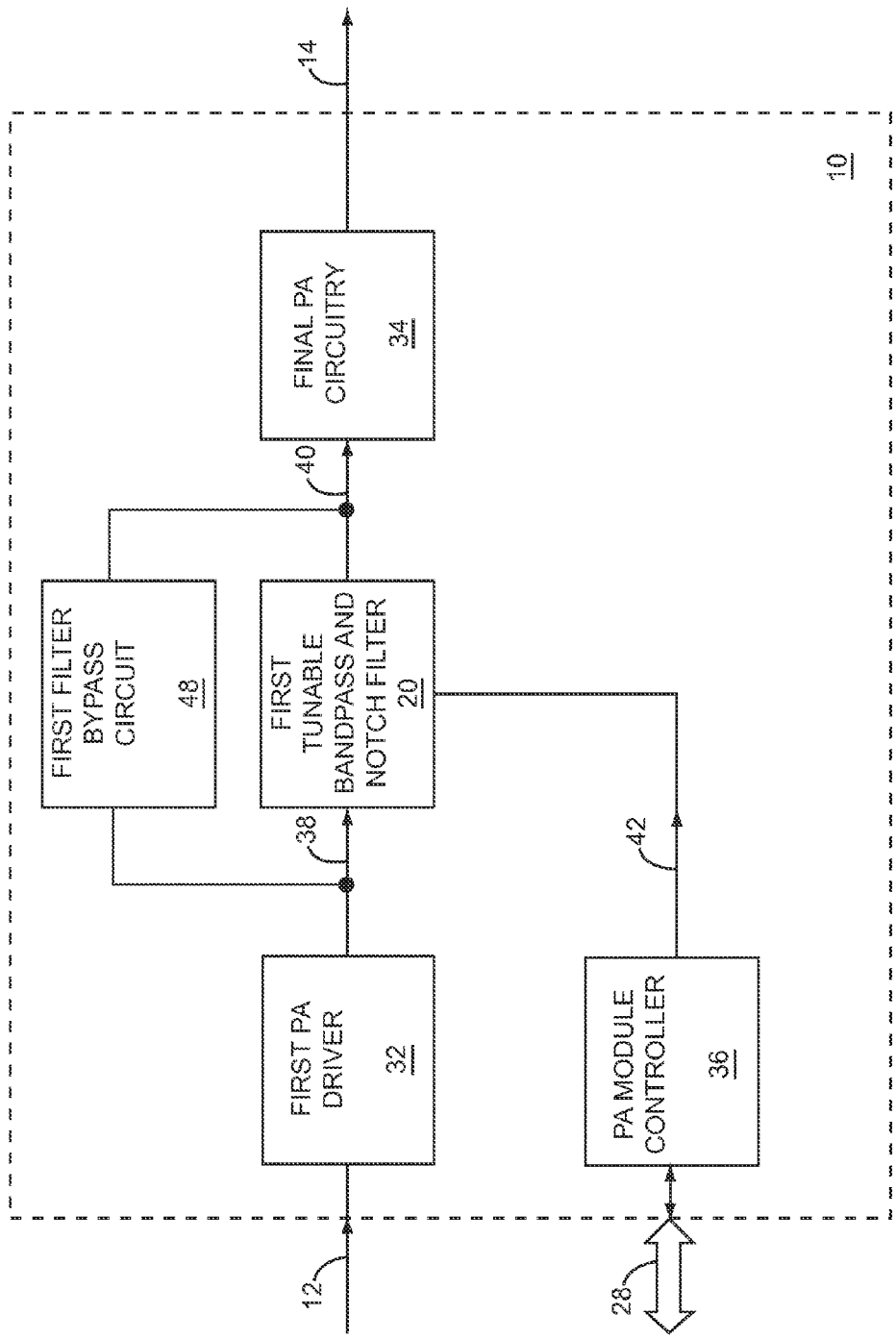
FIG. 6 shows details of the multi-band RF PA module illustrated in FIG. 3 according to an alternate embodiment of the multi-band RF PA module.

FIG. 6 shows details of the multi-band RF PA module 10 illustrated in FIG. 3 according to an alternate embodiment of the multi-band RF PA module 10. The multi-band RF PA module 10 illustrated in FIG. 6 is similar to the multi-band RF PA module 10 illustrated in FIG. 4, except the multi-band RF PA module 10 illustrated in FIG. 6 includes a first filter bypass circuit 48 coupled in parallel with the first tunable bandpass and notch filter 20 to bypass the first tunable bandpass and notch filter 20 when a magnitude of the first RF input signal 12 drops below a first threshold. Additionally, the additional gain provided by the first PA driver 32 may not be needed when the magnitude of the first RF input signal 12 drops below the first threshold. Noise requirements of the multi-band RF PA module 10 may be relaxed in the presence of small signals. Therefore, when the magnitude of the first RF input signal 12 drops below the first threshold, the first tunable bandpass and notch filter 20 may be bypassed, the first PA driver 32 may be turned off, or both to conserve power.

Some wireless communications protocols may have relaxed noise requirements at a maximum rated output power. Therefore, when the multi-band RF PA module 10 is communicating using one or more wireless communications protocols having relaxed noise requirements, the first tunable bandpass and notch filter 20 may be bypassed, the first PA driver 32 may be turned off, or both to conserve power.

Figure 7:
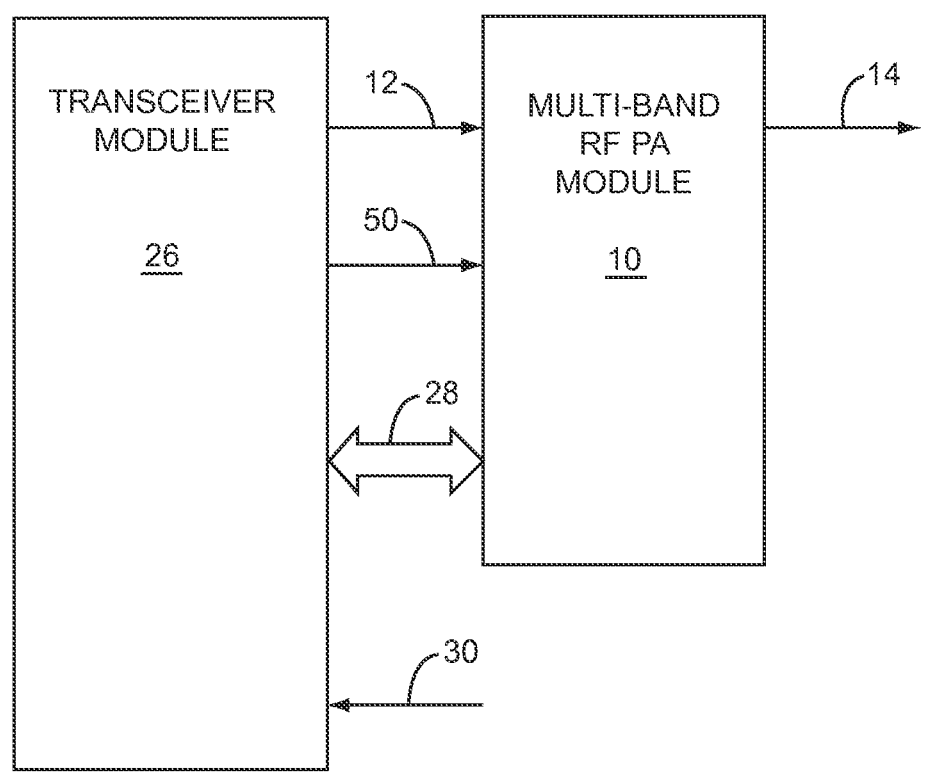
FIG. 7 shows the transceiver module and the multi-band RF PA module according to an alternate embodiment of the transceiver module and the multi-band RF PA module.

FIG. 7 shows the transceiver module 26 and the multi-band RF PA module 10 according to an alternate embodiment of the transceiver module 26 and the multi-band RF PA module 10. The transceiver module 26 and the multi-band RF PA module 10 illustrated in FIG. 7 are similar to the transceiver module 26 and the multi-band RF PA module 10 illustrated in FIG. 3, except the transceiver module 26 illustrated in FIG. 7 further provides a second RF input signal 50 to the multi-band RF PA module 10. The first and second RF input signals 12, 50 may be first and second RF transmit signals, respectively. In an exemplary embodiment of the multi-band RF PA module 10, the first RF input signal 12 is a lowband RF transmit signal and the second RF input signal 50 is a highband RF transmit signal. The first RF output signal 14 may be based on the first RF input signal 12, the second RF input signal 50, or both.

Figure 8:
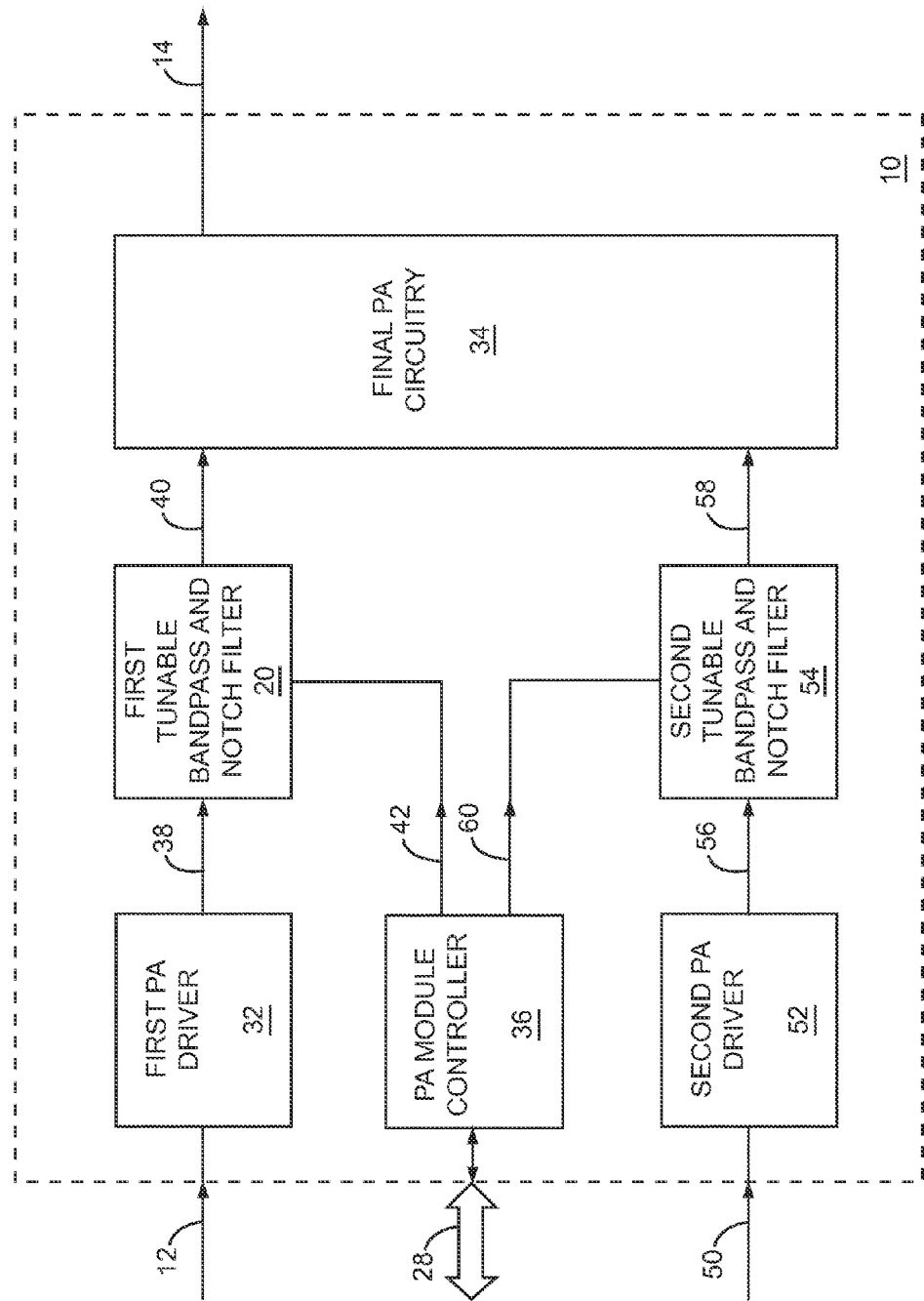
FIG. 8 shows details of the multi-band RF PA module illustrated in FIG. 7 according to an alternate embodiment of the multi-band RF PA module.

FIG. 8 shows details of the multi-band RF PA module 10 illustrated in FIG. 7 according to an alternate embodiment of the multi-band RF PA module 10. The multi-band RF PA module 10 illustrated in FIG. 8 is similar to the multi-band RF PA module 10 illustrated in FIG. 4, except the multi-band RF PA module 10 illustrated in FIG. 8 further includes a second PA driver 52, and a second tunable bandpass and notch filter 54. The second RF input signal 50 feeds the second PA driver 52, which amplifies the second RF input signal 50 to provide a second amplified RF signal 56 to the second tunable bandpass and notch filter 54. The second tunable bandpass and notch filter 54 filters the second amplified RF signal 56 to provide a second filtered RF signal 58 to the final PA circuitry 34, which may amplify the second filtered RF signal 58 to provide the first RF output signal 14. The PA module controller 36 receives and provides the control signals 28 from and to the transceiver module 26 (FIG. 3), and provides a second filter control signal 60 to the second tunable bandpass and notch filter 54 based on the control signals 28. The second tunable bandpass and notch filter 54 tunes a second notch frequency, a second peak frequency, or both based on the second filter control signal 60. The second PA driver 52 may add about net 6 dB of power gain and additional power gain to compensate for losses in the second tunable bandpass and notch filter 54.

When the second notch frequency of the second tunable bandpass and notch filter 54 is tuned to a second desired receive frequency, the receive band noise floor requirements of the transceiver module 26 (FIG. 3) may be relaxed. Further, by providing gain using the second PA driver 52, the RF transmit output power requirement of the transceiver module 26 may be relaxed. As previously mentioned in the first exemplary embodiment of the multi-band RF PA module 10, the multi-band RF PA module 10 is used with a transceiver module 26 having an RF transmit output power requirement of greater than or equal to about −3 dBm. In a second exemplary embodiment of the multi-band RF PA module 10, the multi-band RF PA module 10 is used with a transceiver module 26 having an RF transmit output power requirement of greater than or equal to about −3 dBm and having a receive band noise floor requirement of less than or equal to about −153 dBc per Hz. In another embodiment of the multi-band RF PA module 10, the second PA driver 52 is omitted.

Figure 9:
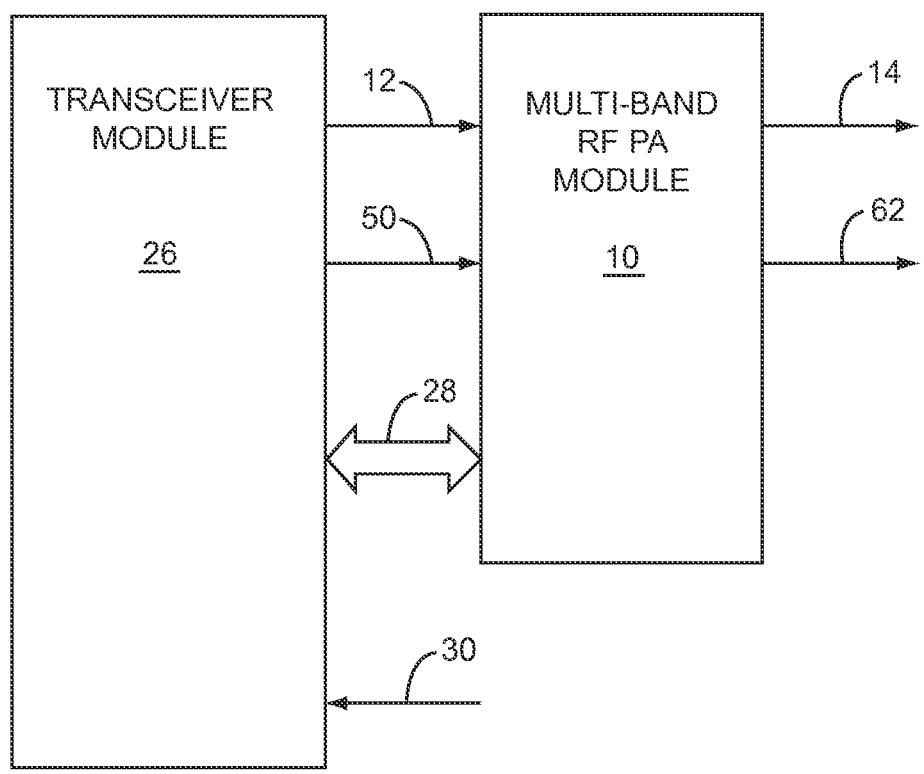
FIG. 9 shows the transceiver module and the multi-band RF PA module according to an additional embodiment of the transceiver module and the multi-band RF PA module.

FIG. 9 shows the transceiver module 26 and the multi-band RF PA module 10 according to an additional embodiment of the transceiver module 26 and the multi-band RF PA module 10. The transceiver module 26 and the multi-band RF PA module 10 illustrated in FIG. 9 are similar to the transceiver module 26 and the multi-band RF PA module 10 illustrated in FIG. 7, except the multi-band RF PA module 10 illustrated in FIG. 9 further provides a second RF output signal 62. The first and the second RF input signals 12, 50 may be the first and the second RF transmit signals, respectively. In an exemplary embodiment of the multi-band RF PA module 10, the first RF input signal 12 is the lowband RF transmit signal and the second RF input signal 50 is a highband RF transmit signal. The first RF output signal 14 may be based on the first RF input signal 12 and the second RF output signal 62 may be based on the second RF input signal 50.

Figure 10:
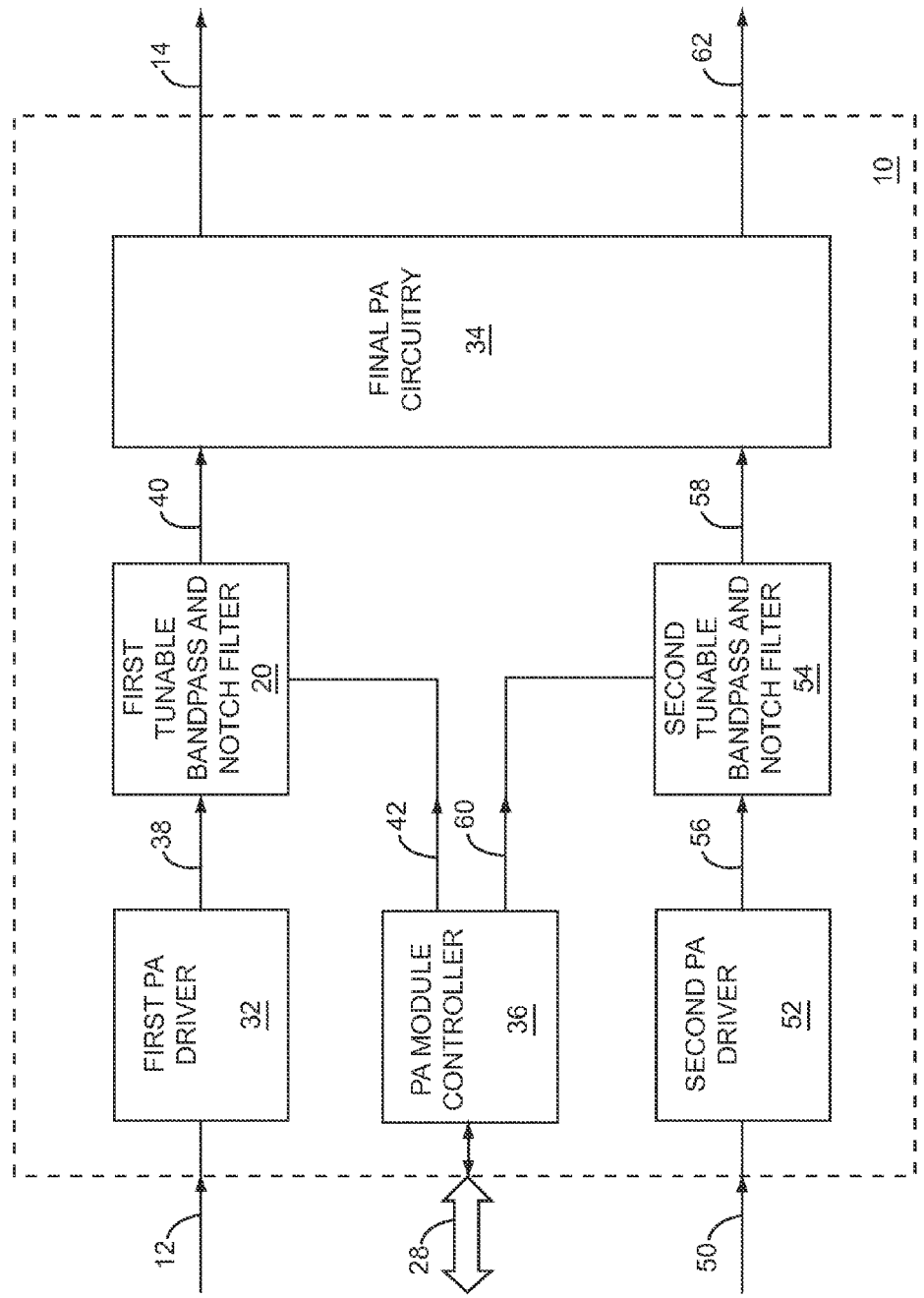
FIG. 10 shows details of the multi-band RF PA module illustrated in FIG. 9 according to an additional embodiment of the multi-band RF PA module.

FIG. 10 shows details of the multi-band RF PA module 10 illustrated in FIG. 9 according to an additional embodiment of the multi-band RF PA module 10. The multi-band RF PA module 10 illustrated in FIG. 10 is similar to the multi-band RF PA module 10 illustrated in FIG. 8, except the final PA circuitry 34 illustrated in FIG. 10 further provides the second RF output signal 62. The first RF output signal 14 may be based on the first filtered RF signal 40 and the second RF output signal 62 may be based on the second filtered RF signal 58.

Figure 11:
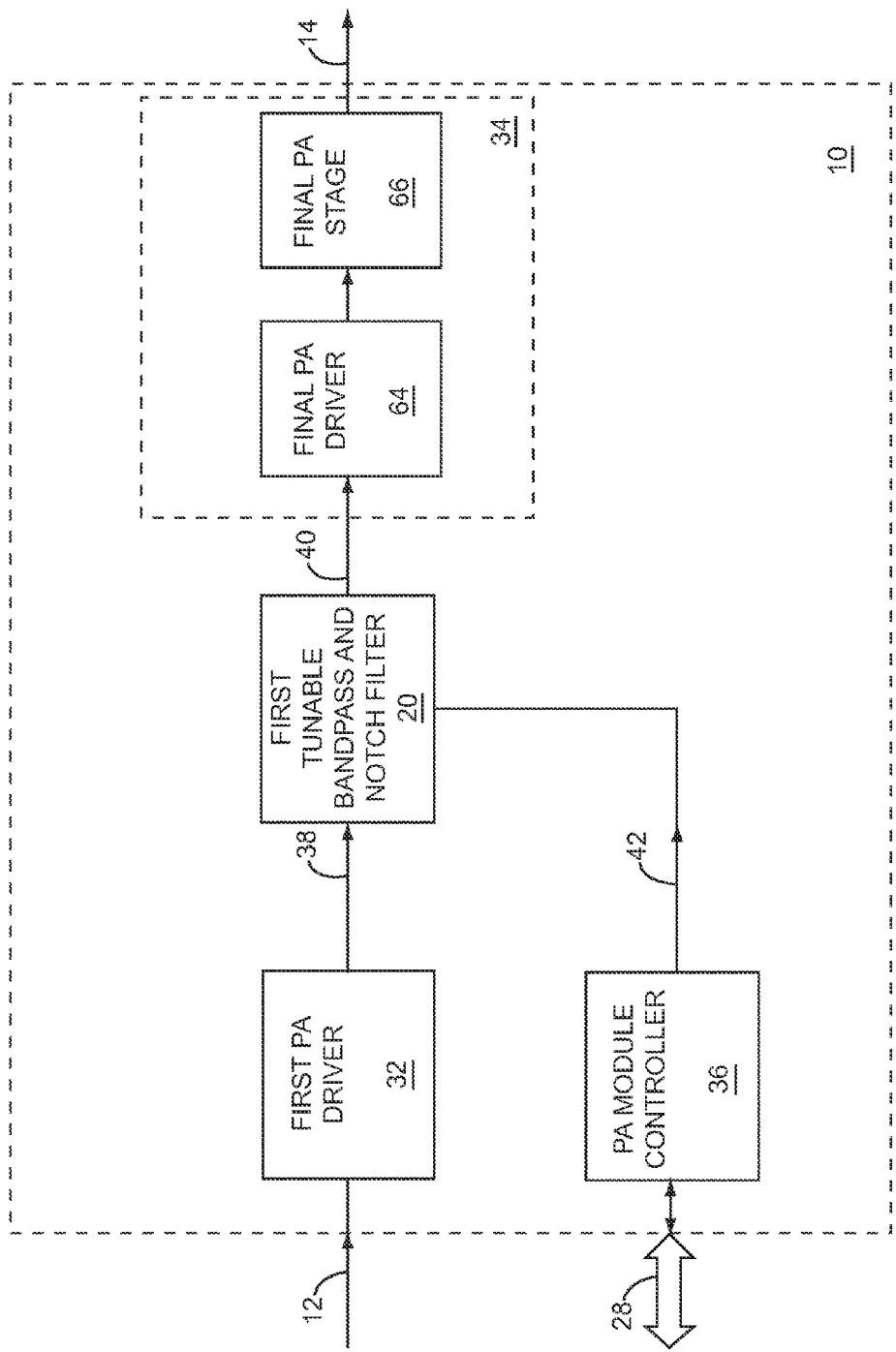
FIG. 11 shows details of the multi-band RF PA module illustrated in FIG. 3 according to one embodiment of the multi-band RF PA module.

FIG. 11 shows details of the final PA circuitry 34 illustrated in FIG. 4 according to one embodiment of the final PA circuitry 34. The final PA circuitry 34 includes a final PA driver 64 and a final PA stage 66. The final PA driver 64 receives and amplifies the first filtered RF signal 40 to feed the final PA stage 66, which further amplifies the first filtered RF signal 40 to provide the first RF output signal 14.

Figure 12:
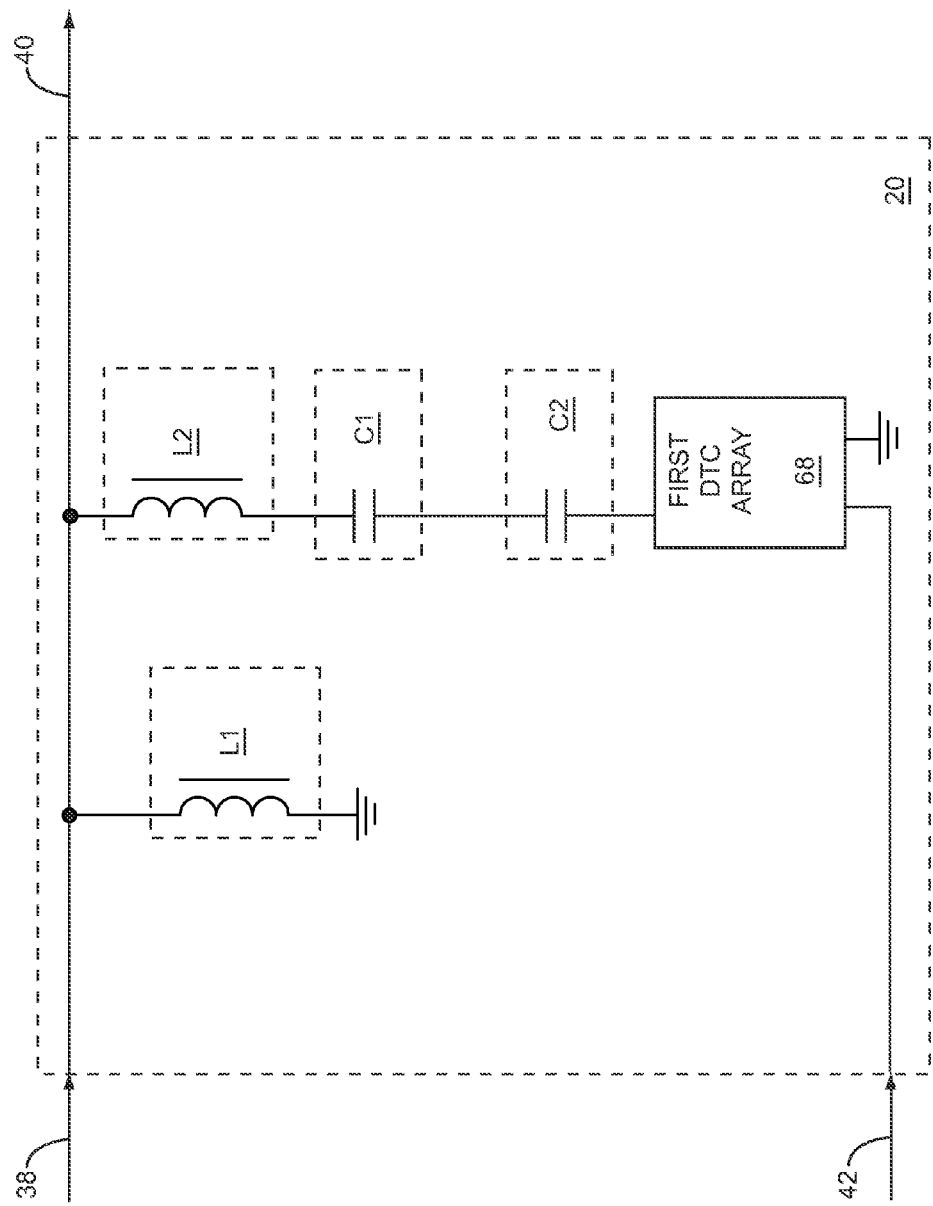
FIG. 12 shows details of the first tunable bandpass and notch filter illustrated in FIG. 4 according to one embodiment of the first tunable bandpass and notch filter.

FIG. 12 shows details of the first tunable bandpass and notch filter 20 illustrated in FIG. 4 according to one embodiment of the first tunable bandpass and notch filter 20. The first tunable bandpass and notch filter 20 includes a first DTC array 68, the first inductive element L1, a second inductive element L2, a first capacitive element C1, and a second capacitive element C2. One end of the first inductive element L1 is coupled to ground and an opposite end of the first inductive element L1 receives the first amplified RF signal 38 and provides the first filtered RF signal 40 based on filtering the first amplified RF signal 38. The second inductive element L2, the first capacitive element C1, the second capacitive element C2, and the first DTC array 68 are coupled in series to one another to form a first series coupling, which is coupled across the first inductive element L1. A first capacitance associated with the first DTC array 68 is based on the first filter control signal 42. The first notch frequency $F_N$ may be based primarily on the series resonance characteristics of the first series coupling. The first peak frequency $F_P$ may be based primarily on the parallel resonance characteristics of the first series coupling, the first inductive element L1, and external impedances. The first tunable bandpass and notch filter 20 may provide impedance matching between the first PA driver 32 and the final PA circuitry 34. Therefore, the first series coupling and the first inductive element L1 may provide bandpass and notch filter behavior of the first tunable bandpass and notch filter 20.

Figure 13:
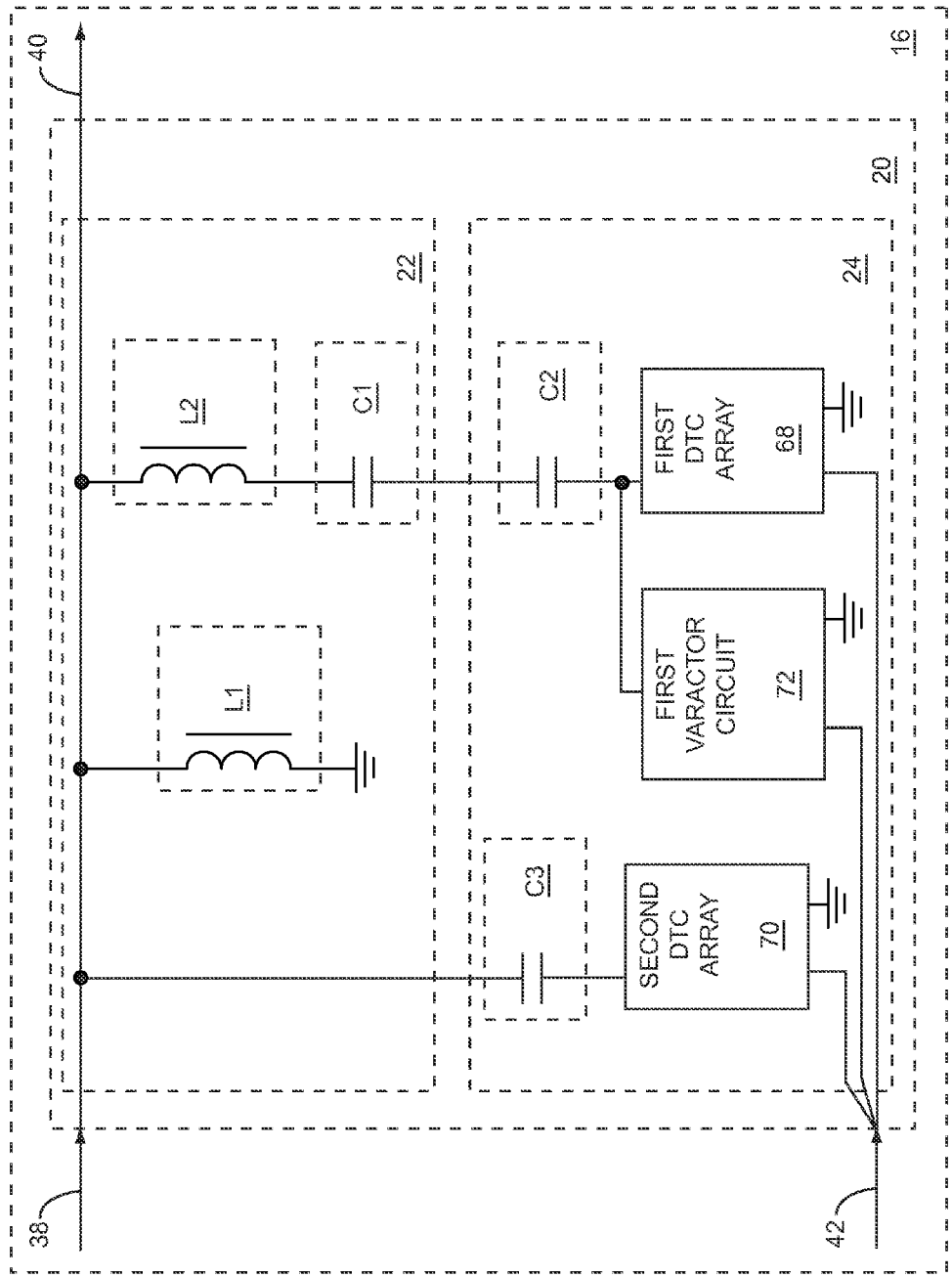
FIG. 13 shows details of the first tunable bandpass and notch filter illustrated in FIG. 4 according to an alternate embodiment of the first tunable bandpass and notch filter.

FIG. 13 shows details of the first tunable bandpass and notch filter 20 illustrated in FIG. 4 according to an alternate embodiment of the first tunable bandpass and notch filter 20. The first tunable bandpass and notch filter 20 illustrated in FIG. 13 is similar to the first tunable bandpass and notch filter 20 illustrated in FIG. 12, except the first tunable bandpass and notch filter 20 illustrated in FIG. 13 further includes a third capacitive element C3, a second DTC array 70, and a first varactor circuit 72. The third capacitive element C3 is coupled in series with the second DTC array 70 to form a second series coupling, which is coupled across the first inductive element L1, such that a second capacitance associated with the second DTC array 70 is based on the first filter control signal 42. The first varactor circuit 72 is coupled across the first DTC array 68, such that a third capacitance associated with the first varactor circuit 72 is based on the first filter control signal 42. Therefore, the first series coupling illustrated in FIG. 13 includes the first varactor circuit 72 coupled across the first DTC array 68. The first varactor circuit 72 provides analog tuning of the third capacitance, the first DTC array 68 provides digital tuning of the first capacitance, and the second DTC array 70 provides digital tuning of the second capacitance. The analog tuning may provide finer resolution than the digital tuning. A duplex frequency of the multi-band RF PA module 20 is based on the second series coupling, the first series coupling, and the first inductive element L1, and may be tuned using the second DTC array 70.

The supporting substrate 16 provides the first tunable bandpass and notch filter 20. The supporting substrate 16 includes the first and the second inductive elements L1, L2 and the first capacitive element C1. Such inductive elements may be high-Q inductive elements, which may be necessary to minimize losses in the first tunable bandpass and notch filter 20. In an exemplary embodiment of the first inductive element L1, the first inductive element L1 includes a printed inductive element, a discrete SMD inductive element, at least one bond wire that serves as an inductive element, or any combination thereof. In an exemplary embodiment of the first capacitive element C1, the first capacitive element C1 includes a discrete SMD capacitive element. The first and the second inductive elements L1, L2 and the first capacitive element C1 provide the first portion 22 of the first tunable bandpass and notch filter 20. The first semiconductor die 18 provides the second portion 24 of the first tunable bandpass and notch filter 20 by providing the first and the second DTC arrays 68, 70, and the second and the third capacitive elements C2, C3. By coupling the second capacitive element C2 in series with the first DTC array 68, capacitances of elements within the first DTC array 68 may be increased, which may improve linearity of the first tunable bandpass and notch filter 20. Similarly, by coupling the third capacitive element C3 in series with the second DTC array 70, capacitances of elements within the second DTC array 70 may be increased, which may improve linearity of the first tunable bandpass and notch filter 20. The first filter control signal 42 may include multiple control signals, which may be needed to properly control the first and the second DTC arrays 68, 70 and the first varactor circuit 72. In an alternate embodiment of the first tunable bandpass and notch filter 20, either or both of the second DTC array 70 and the first varactor circuit 72 may be omitted. In one embodiment of the first tunable bandpass and notch filter 20, any or all of the first and the second DTC arrays 68, 70 and the first varactor circuit 72 may be tuned for maximum gain in the first tunable bandpass and notch filter 20 at the first desired transmit frequency $F_T$ and whatever attenuation is provided by the first tunable bandpass and notch filter 20 at the first desired receive frequency $F_R$ may be acceptable.

At a resonant frequency of the first series coupling, the impedance of the first series coupling approaches zero, which provides the notch. However, voltage swings at the junction of the second inductive element L2 and the first capacitive element C1 may be quite large if a magnitude of the first RF signal 12 at the resonant frequency is significant. Further, since the first notch frequency $F_N$ may be about equal to the resonant frequency of the first series coupling, and since the first tunable bandpass and notch filter 20 may be tuned such that the first peak frequency $F_P$ is about equal to the first desired transmit frequency $F_T$ and the first notch frequency $F_N$ is ideally about equal to the first desired receive frequency $F_R$, the first desired receive frequency $F_R$ may be nearly equal to the resonant frequency of the first series coupling. When the multi-band RF PA module 10 is amplifying the first RF transmit signal, the magnitude of the first RF signal 12 at the first desired receive frequency $F_R$ should be fairly small, since such signals at the first desired receive frequency $F_R$ in the transmit path are noise signals. However, the magnitude of the first RF signal 12 at the first desired transmit frequency $F_T$ may be large, such as −3 dBm.

If the duplex frequency offset is somewhat small, the first desired transmit frequency $F_T$ may be close enough to the resonant frequency of the first series coupling to produce fairly significant voltage swings at the junction of the second inductive element L2 and the first capacitive element C1. Such voltage swings are divided across the first capacitive element C1, the second capacitive elements C2, and the parallel combination of the first DTC array 68 and the first varactor circuit 72. Since the first semiconductor die 18 may include any or all of the second capacitive elements C2, the first DTC array 68, and the first varactor circuit 72, the first capacitive element C1 reduces the voltage swings presented to the first semiconductor die 18 and the second capacitive elements C2 further reduces the voltage swings presented to the first DTC array 68 and the first varactor circuit 72.

Even with the voltage swing reduction provided by the first capacitive element C1, the voltage swings presented to the first semiconductor die 18 may preclude using a tunable bandpass and notch filter on an SoC semiconductor die due to the low voltage ratings of the SoC transistors. Additional embodiments of the first tunable bandpass and notch filter 20 may omit the first capacitive element C1, may omit the second capacitive element C2, may combine the first and the second capacitive elements C1, C2 into a single capacitive element, or any combination thereof.

Figure 14A:
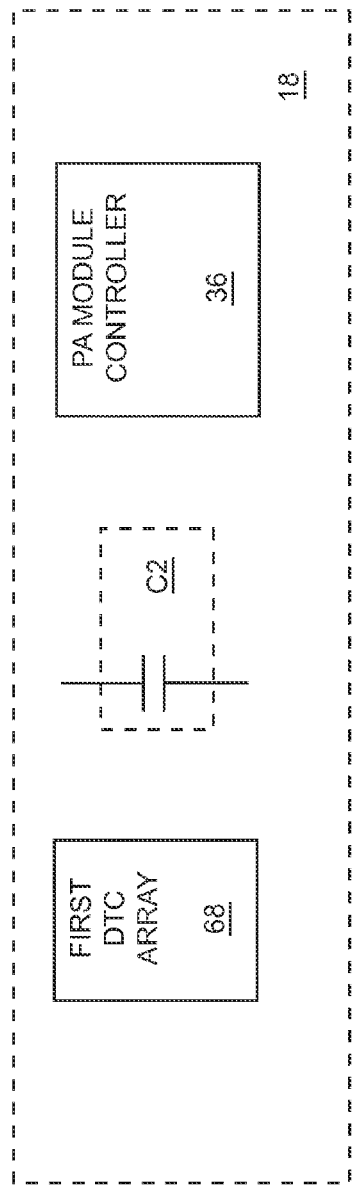
FIG. 14A shows details of a first semiconductor die illustrated in FIG. 2 according to one embodiment of the first semiconductor die.

FIG. 14A shows details of the first semiconductor die 18 illustrated in FIG. 2 according to one embodiment of the first semiconductor die 18. The first semiconductor die 18 includes the first DTC array 68, the second capacitive element C2, and the PA module controller 36.

Figure 14B:
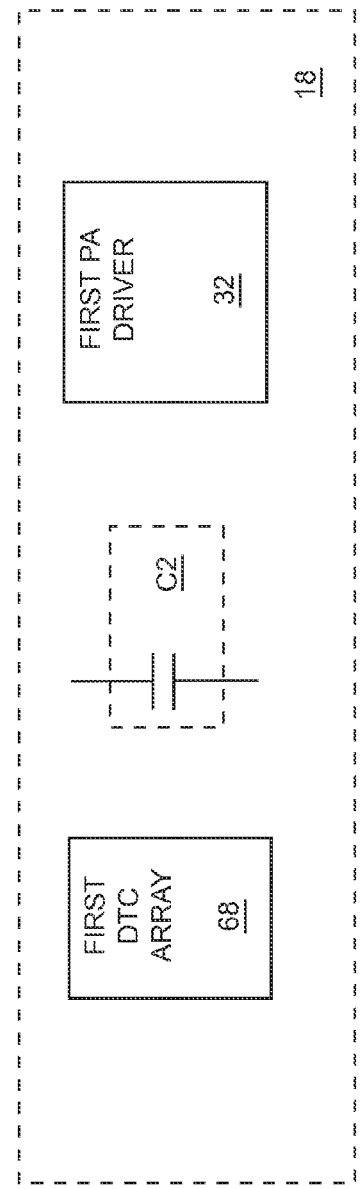
FIG. 14B shows details of the first semiconductor die illustrated in FIG. 2 according to an alternate embodiment of the first semiconductor die.

FIG. 14B shows details of the first semiconductor die 18 illustrated in FIG. 2 according to an alternate embodiment of the first semiconductor die 18. The first semiconductor die 18 includes the first DTC array 68, the second capacitive element C2, and the first PA driver 32.

Figure 15:
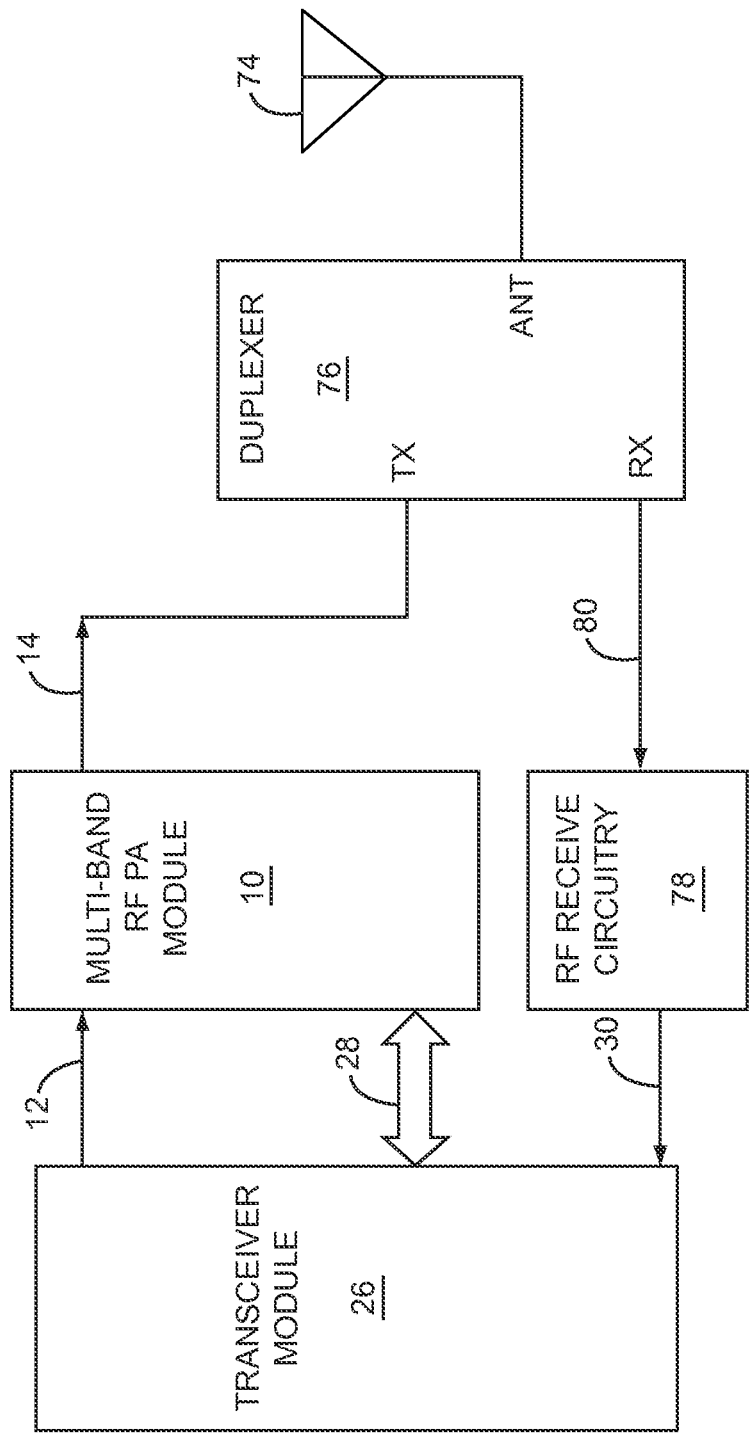
FIG. 15 shows the transceiver module, the multi-band RF PA module, an RF antenna, a duplexer, and RF receive circuitry according to one embodiment of the transceiver module, the multi-band RF PA module, the RF antenna, the duplexer, and the RF receive circuitry.

FIG. 15 shows the transceiver module 26, the multi-band RF PA module 10, an RF antenna 74, a duplexer 76, and RF receive circuitry 78 according to one embodiment of the transceiver module 26, the multi-band RF PA module 10, the RF antenna 74, the duplexer 76, and the RF receive circuitry 78. The transceiver module 26 and the multi-band RF PA module 10 illustrated in FIG. 15 are similar to the transceiver module 26 and the multi-band RF PA module 10 illustrated in FIG. 3. The RF antenna 74 is coupled to an antenna port ANT of the duplexer 76, the first RF output signal 14 is fed to a transmit port TX of the duplexer 76, and a front-end RF receive signal 80 is fed from a receive port RX of the duplexer 76 to the RF receive circuitry 78, which provides at least one RF receive signal 30 to the transceiver module 26 based on the front-end RF receive signal 80. The RF receive circuitry 78 may include low noise amplifiers (LNAs), RF filters, RF switches, the like, or any combination thereof. The duplexer 76 may be needed in wireless communications systems that may operate using a full-duplex mode. In the full-duplex mode, RF transmit signals and RF receive signals may be sent and received simultaneously using the RF antenna 74. The duplexer 76 routes RF receive signals from the antenna port ANT to the receive port RX and routes RF transmit signals from the transmit port TX to the antenna port ANT. The duplexer 76 isolates the transmit port TX from the receive port RX to prevent the RF transmit signals and the RF receive signals from interfering with one another. The duplexer 76 has the duplex frequency offset, which is the difference between the frequencies of RF transmit signals and RF receive signals. When the first tunable bandpass and notch filter 20 (FIG. 4) is used to reduce RF receive band noise from the transceiver module 26, the requirements for isolating the transmit port TX from the receive port RX may be relaxed.

Figure 16:
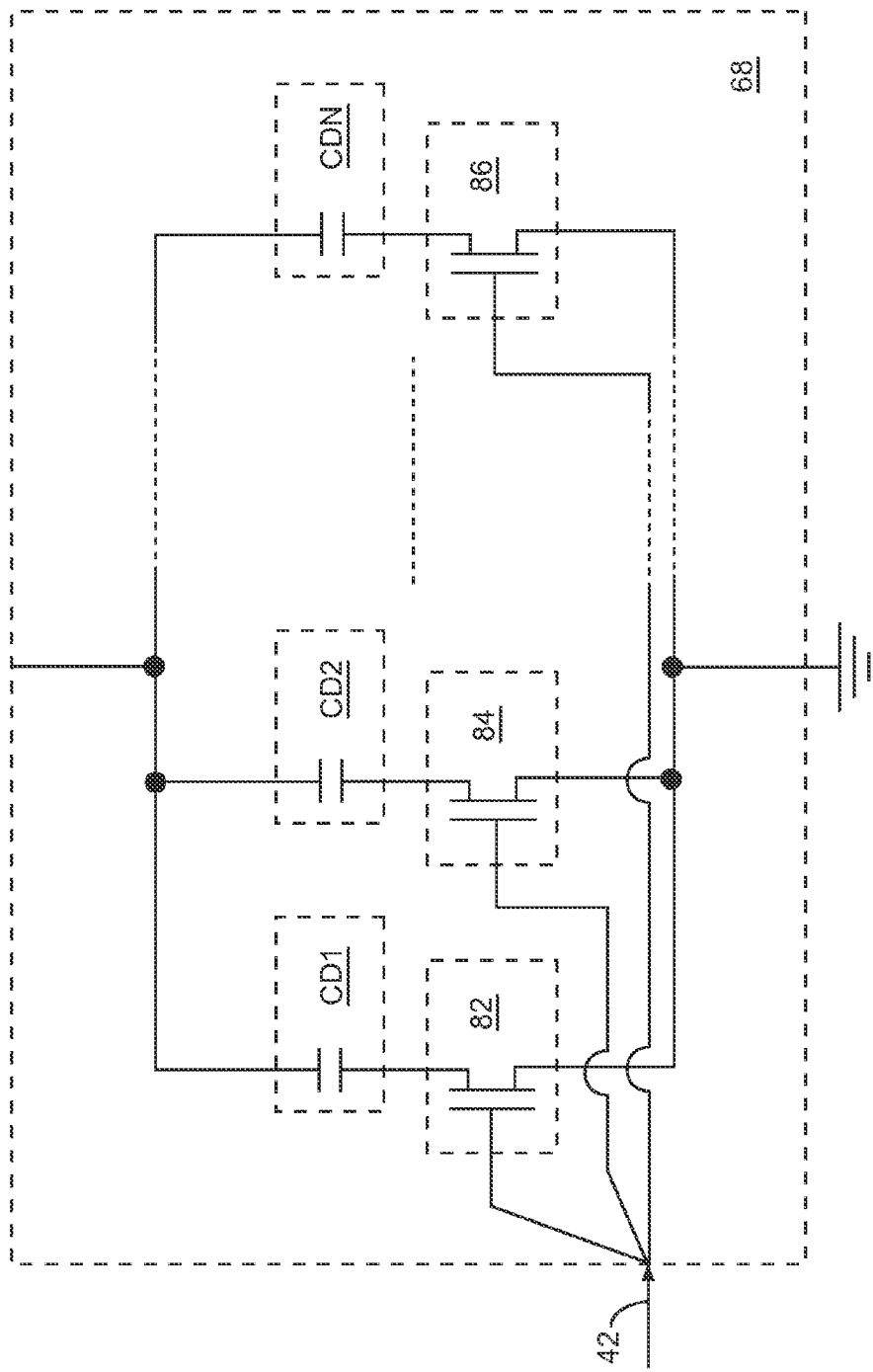
FIG. 16 shows details of a first digital tunable capacitor (DTC) array illustrated in FIG. 13 according to one embodiment of the first DTC array.

FIG. 16 shows details of the first DTC array 68 illustrated in FIG. 13 according to one embodiment of the first DTC array 68. The first DTC array 68 includes a first switching transistor element 82, a second switching transistor element 84, and up to and including an $N^{TH}$ switching transistor element 86. Further, the first DTC array 68 includes a first DTC capacitive element CD1, a second DTC capacitive element CD2, and up to and including an $N^{TH}$ DTC capacitive element CDN. Each of the switching transistor elements 82, 84, 86 is coupled in series with a corresponding each of the DTC capacitive elements CD1, CD2, CDN. The series couplings are coupled in parallel to one another. The first filter control signal 42 provides a control signal to a gate of each of the switching transistor elements 82, 84, 86, such that each of the switching transistor elements 82, 84, 86 is in either an ON state or an OFF state. As previously mentioned, the first DTC array 68 provides the first capacitance based on the first filter control signal 42. When each of the switching transistor elements 82, 84, 86 is in its ON state, the corresponding each of the DTC capacitive elements CD1, CD2, CDN contributes to the first capacitance. Conversely, when each of the switching transistor elements 82, 84, 86 is in its OFF state, the corresponding each of the DTC capacitive elements CD1, CD2, CDN does not contribute to the first capacitance.

Figure 17:
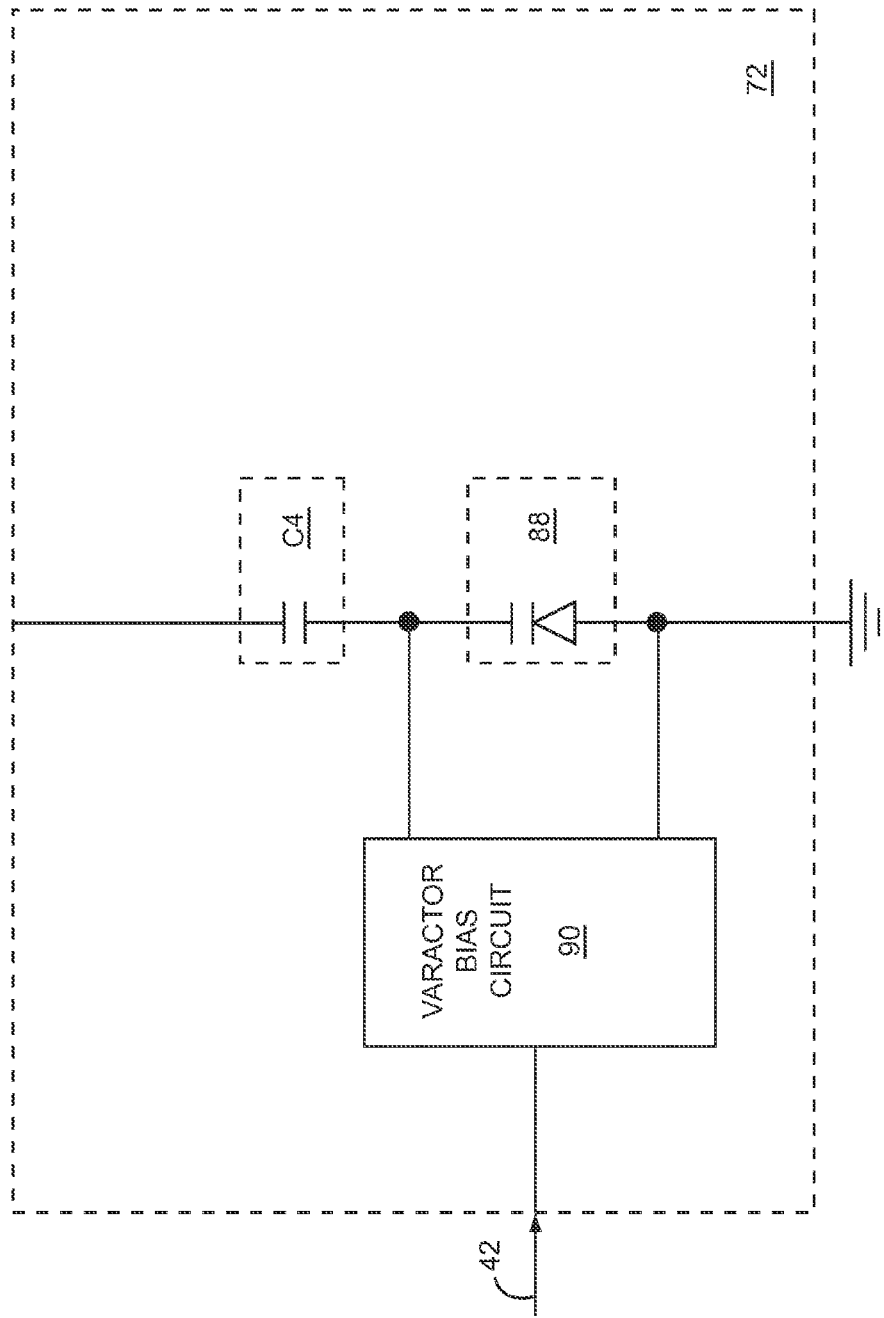
FIG. 17 shows details of a first varactor circuit illustrated in FIG. 13 according to one embodiment of the first varactor circuit.

FIG. 17 shows details of the first varactor circuit 72 illustrated in FIG. 13 according to one embodiment of the first varactor circuit 72. The first varactor circuit 72 includes a first varactor diode 88, a varactor bias circuit 90, and a fourth capacitive element C4. As previously mentioned, the first varactor circuit 72 provides the third capacitance based on the first filter control signal 42. The first varactor diode 88 is coupled in series with the fourth capacitive element C4 to provide the third capacitance. The varactor bias circuit 90 is coupled across the first varactor diode 88 to provide a direct current (DC) bias voltage to the first varactor diode 88. The capacitance of the first varactor diode 88 is based on a magnitude of the DC bias voltage.

The varactor bias circuit 90 receives the first filter control signal 42, such that the magnitude of the DC bias voltage is based on the first filter control signal 42. The fourth capacitive element C4 is used to alternating current (AC) couple the first varactor diode 88 to the first DTC array 68, thereby isolating the DC bias voltage from the first DTC array 68.

Some of the circuitry previously described may use discrete circuitry, integrated circuitry, programmable circuitry, non-volatile circuitry, volatile circuitry, software executing instructions on computing hardware, firmware executing instructions on computing hardware, the like, or any combination thereof. The computing hardware may include mainframes, micro-processors, micro-controllers, DSPs, the like, or any combination thereof.

None of the embodiments of the present disclosure are intended to limit the scope of any other embodiment of the present disclosure. Any or all of any embodiment of the present disclosure may be combined with any or all of any other embodiment of the present disclosure to create new embodiments of the present disclosure.

Those skilled in the art will recognize improvements and modifications to the preferred embodiments of the present disclosure. All such improvements and modifications are considered within the scope of the concepts disclosed herein and the claims that follow.

What is claimed is:

1. A multi-band radio frequency (RF) power amplifier (PA) module adapted to receive, filter, and amplify a first RF input signal to provide a first RF output signal using a first tunable bandpass and notch filter, and comprising:
   a supporting substrate comprising at least one inductive element, which provides a first portion of the first tunable bandpass and notch filter; and
   at least one semiconductor die attached to the supporting substrate, such that at least a first of the at least one semiconductor die comprises at least one digital tunable capacitor (DTC) array, which provides a second portion of the first tunable bandpass and notch filter.

2. The multi-band RF PA module of claim 1 further comprising a first PA driver and adapted to:
   amplify the first RF input signal using the first PA driver to provide a first amplified RF signal;
   filter the first amplified RF signal using the first tunable bandpass and notch filter to provide a first filtered RF signal; and
   amplify the first filtered RF signal to provide the first RF output signal,
   wherein the first RF input signal is a first RF transmit signal.

3. The multi-band RF PA module of claim 2 further comprising a transceiver module adapted to:
   provide the first RF input signal;
   receive and provide control signals from and to the multi-band RF PA module; and
   tune the first tunable bandpass and notch filter using the control signals.

4. The multi-band RF PA module of claim 3 wherein a first notch frequency of the first tunable bandpass and notch filter is about equal to a frequency of a noise spur from the transceiver module.

5. The multi-band RF PA module of claim 3 wherein a first notch frequency of the first tunable bandpass and notch filter is about equal to a first desired receive frequency.

6. The multi-band RF PA module of claim 3 wherein a first peak frequency of the first tunable bandpass and notch filter is about equal to a first desired transmit frequency.

7. The multi-band RF PA module of claim 3 wherein a difference between a first desired transmit frequency and a first peak frequency of the first tunable bandpass and notch filter is based on a maximum acceptable first insertion loss, and a difference between a first desired receive frequency and a first notch frequency of the first tunable bandpass and notch filter is based on a minimum acceptable first attenuation.

8. The multi-band RF PA module of claim 3 wherein the transceiver module comprises a multi-band system-on-a-chip (SoC) semiconductor die.

9. The multi-band RF PA module of claim 3 wherein the transceiver module has a receive band noise floor requirement of less than or equal to about −153 decibels with respect to carrier (dBc) per Hertz.

10. The multi-band RF PA module of claim 2 wherein the multi-band RF PA module is a multi-mode multi-band RF PA module adapted to receive, filter, and amplify at least two selected from a group consisting of simplex RF signals, half-duplex RF signals, and full-duplex RF signals.

11. The multi-band RF PA module of claim 2 further adapted to receive, filter, and amplify a second RF input signal using a second tunable bandpass and notch filter, such that the first RF input signal is a lowband RF transmit signal and the second RF input signal is a lowband RF transmit signal.

12. The multi-band RF PA module of claim 2 further comprising:
   final PA circuitry adapted to amplify the first filtered RF signal to provide the first RF output signal; and
   a PA module controller adapted to provide a first filter control signal to the first tunable bandpass and notch filter, such that the first tunable bandpass and notch filter tunes at least one of a first notch frequency and a first peak frequency based on the first filter control signal.

13. The multi-band RF PA module of claim 12 wherein the first tunable bandpass and notch filter comprises:
   a first of the at least one first inductive element having one end coupled to ground and an opposite end adapted to receive the first amplified RF signal and provide the first filtered RF signal; and
   a second inductive element, a first capacitive element, a second capacitive element, and a first of the at least one DTC array coupled in series to one another to form a first series coupling, which is coupled across the first inductive element, such that a first capacitance associated with the first of the at least one DTC array is based on the first filter control signal,
   wherein the first series coupling and the first inductive element provide bandpass and notch filter behavior of the first tunable bandpass and notch filter.

14. The multi-band RF PA module of claim 13 wherein the first tunable bandpass and notch filter further comprises a third capacitive element coupled in series with a second of the at least one DTC array to form a second series coupling, which is coupled across the first inductive element, such that a second capacitance associated with the second of the at least one DTC array is based on the first filter control signal, wherein a duplex frequency of the multi-band RF PA module is based on the second series coupling, the first series coupling, and the first inductive element.

15. The multi-band RF PA module of claim 14 wherein the first tunable bandpass and notch filter further comprises a first varactor circuit coupled across the first of the at least one DTC array, such that a third capacitance associated with the first varactor circuit is based on the first filter control signal, the first varactor circuit provides analog tuning of the third capacitance, the first of the at least one DTC array provides digital tuning of the first capacitance, and the second of the at least one DTC array provides digital tuning of the second capacitance.

16. The multi-band RF PA module of claim 13 wherein the first of the at least one semiconductor die comprises the first of the at least one DTC array, the second capacitive element, and the PA module controller.

17. The multi-band RF PA module of claim 13 wherein the first of the at least one semiconductor die further comprises the second capacitive element and the first PA driver.

18. The multi-band RF PA module of claim 13 wherein the first inductive element comprises at least one selected from a group consisting of a printed inductive element, a discrete surface mount device (SMD) inductive element, and at least one bond wire that serves as an inductive element.

19. The multi-band RF PA module of claim 12 further comprising a first filter bypass circuit coupled across the first tunable bandpass and notch filter and adapted to bypass the first tunable bandpass and notch filter and turn off the first PA driver when a magnitude of the first RF input signal drops below a first threshold.

20. A method comprising:
- providing a multi-band radio frequency (RF) power amplifier (PA) module comprising:
    - a first tunable bandpass and notch filter;
    - a first PA driver;
    - a supporting substrate comprising at least one inductive element, which provides a first portion of the first tunable bandpass and notch filter; and
    - at least one semiconductor die attached to the supporting substrate, such that at least one of the at least one semiconductor die comprises at least one digital tunable capacitor (DTC) array, which provides a second portion of the first tunable bandpass and notch filter;
- amplifying a first RF input signal to provide a first amplified RF signal using the first PA driver;
- filtering the first amplified RF signal to provide a first filtered RF signal using the first tunable bandpass and notch filter; and
- amplifying the first filtered RF signal to provide a first RF output signal.

* * * * *